Feb. 1, 1966  H. MICHL  3,231,932
APPARATUS FOR SHIRRING SAUSAGE CASINGS
Filed July 18, 1963
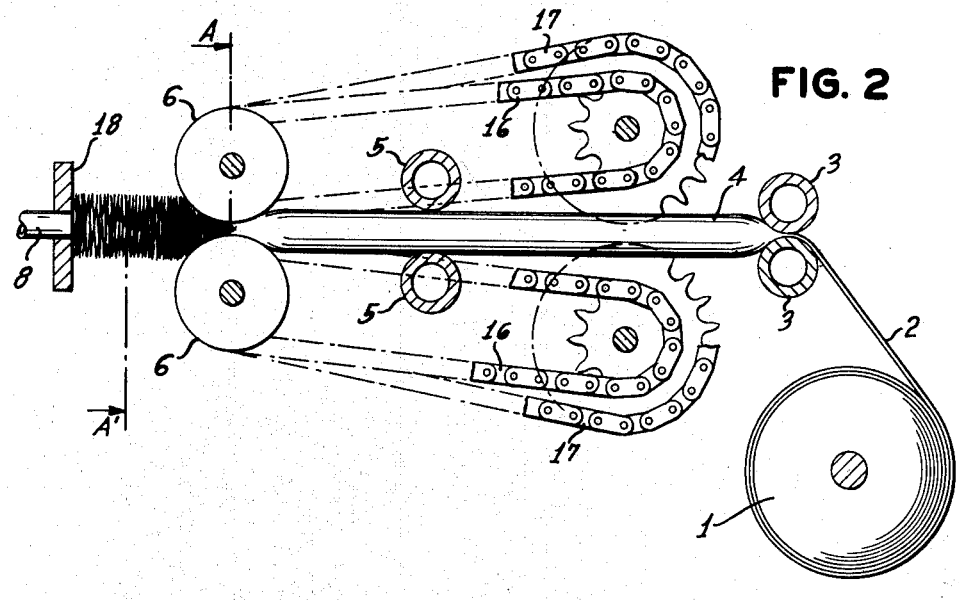
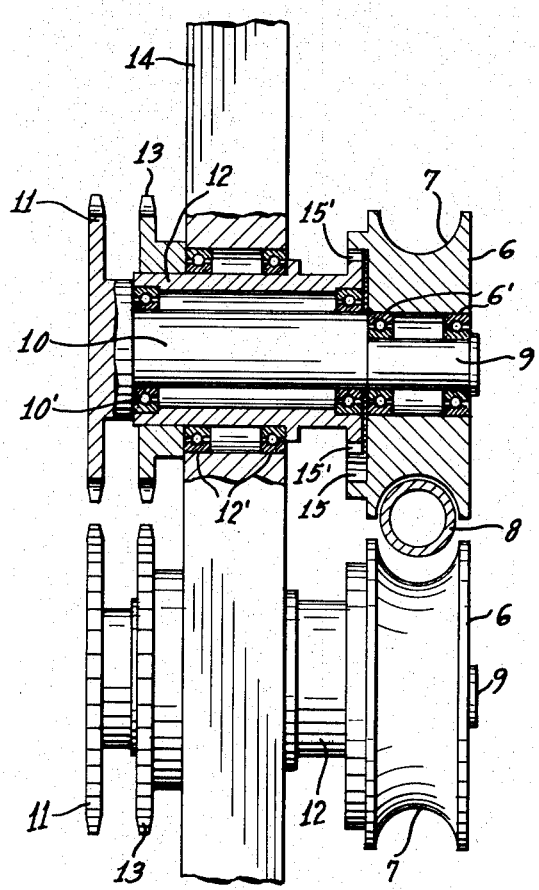
INVENTOR.
HORST MICHL
BY
James E. Bryan
ATTORNEY United States Patent Office 3,231,932
Patented Feb. 1, 1966

3,231,932
APPARATUS FOR SHIRRING SAUSAGE CASINGS
Horst Michl, Wiesbaden, Germany, assignor to Kalle Aktiengesellschaft, Wiesbaden-Biebrich, Germany
Filed July 18, 1963, Ser. No. 295,997
Claims priority, application Germany, July 19, 1962, K 47,271
5 Claims. (Cl. 17—42)

This invention relates to an apparatus for shirring sausage casings.

Sausage casings are sometimes prepared in shirred form for the purpose of handling them more satisfactorily on sausage filling machines, i.e., they are so compressed, with the formation of creases, that a more or less stiffened, hollow, bellows-like body is formed from the sausage casing. For filling with the sausage filling material, the hollow bellows-like body is then placed on the filling nozzle of the filling machine.

In U.S. Patent No. 3,142,861, granted August 4, 1964, a method is described for shirring sausage casings in which the casings are protected against damage caused by the mechanical action of the shirring device. In the process of the above-mentioned patent, the sausage casings are drawn over a mandrel and shirred against an abutment thereon. The sausage casing on the mandrel is urged towards the abutment by means of feed rolls reciprocating in a direction normal to the direction of advancement of the casing.

It has now been found that sausage casings to be shirred are better protected when the rolls reciprocate parallel to the mandrel axis as well as normal thereto.

In the present invention, which is a modification of the process of the patent above-identified, the advancement rolls reciprocate in two directions, i.e., the roll axes describe a circle due to an eccentric mounting thereof. Most advantageously, this movement is performed is a manner such that, apart from the rotation about their axes, the advancement rolls move in the direction of the feed of the sausage casing when they are more closely adjacent the mandrel and return, in the opposite direction, when in the course of their movement they are distant from the mandrel. For example, the movement may be a circular movement in which the advancement rolls move with the greatest speed in the direction of the feed of the sausage casing, when they are closest to the mandrel. When, in the process of the present invention, two advancement rolls are used for shirring the sausage casing, which rolls are oppositely disposed to the axis of the mandrel, these advancement rolls are advantageously caused to move in such a way that they alternate in approaching the mandrel. Thus, one of the rolls will reach its greatest distance from the mandrel while the other is nearest to it, and vice versa. In this case, the rolls may be maintained a constant distance apart.

However, the process of the present invention may also be performed in a manner which differs from the just described processes. Thus, sausage casings are shirred with good results if two advancement rolls, which are arranged oppositely with reference to the axis of the mandrel, do not simultaneously move upwardly and downwardly, but move to and fro so that they are either approaching or diverging from each other. Likewise, the process of the present invention can be performed in such a way that more than two advancement rolls are used for advancing and shirring the sausage casings.

Also described in the patent above-identified, is an apparatus for carrying out the above method for shirring sausage casings. This apparatus includes a mandrel and means for advancement of the sausage casing which are disposed laterally from the mandrel. In the apparatus described in the patent above-identified, the means for advancement of the sausage casing comprises a pair of advancement rolls having peripheral grooves of constant cross-section which are oppositely disposed with reference to the mandrel, and are mounted for reciprocation normal to the mandrel. As has now been found, the apparatus according to the patent above-identified is of still greater utility when the advancement rolls are mounted for reciprocation parallel to the axis of the mandrel as well as normal thereto.

The invention is further illustrated in the accompanying drawings, in which:

FIGURE 1 is a front view in elevation of one embodiment of the apparatus of the invention, partly in section, taken on the line A–A' of FIGURE 2, and FIGURE 2 is a side view in elevation on a reduced scale of the apparatus during the compression of a sausage casing.

Referring to FIGURE 2, the apparatus comprises a supply reel or drum 1 having a flat roll of sausage casing thereon, a pair of nip rolls 3, a pair of guide rolls 5, advancement rolls 6 provided with peripheral grooves 7 and being driven in opposite directions, a hollow mandrel 8 and means for rotating and reciprocating the advancement rolls, which means are shown in detail in FIGURE 1. The apparatus is mounted on a frame 14 and the driving force may be supplied by any known means, e.g., by means of gear drive or pulley drive; in the embodiment shown, a chain drive is provided.

The sausage casing 2 to be shirred is drawn from the supply drum 1 and advanced to the shirring device. It passes first the pair of nip rolls 3, is then inflated to form a round tube 4 by the introduction of air through the hollow mandrel 8, passes a pair of guide rolls 5 and is then drawn between the two advancement rolls 6, by means of which the casing is compressed against the abutment 18 or against the compressed casing collecting in front of the abutment, respectively. The advancement rolls 6 are rotated by the chains 16 and reciprocated by the chains 17.

The chains 16 drive the sprockets 13 which, in turn, are secured to hollow shafts 12. These hollow shafts 12 are mounted for rotation in the frame 14 by means of ball bearings 12'. Each of them is further provided with a cog wheel, the lugs 15' of which engage the internal teeth 15 on the advancement rolls 6. This causes the rotation of the advancement rolls 6, which are mounted for rotation on shafts 9 by means of ball bearings 6'. While the advancement rolls 6 are rotated in this manner, the chains 17 drive the sprockets 11.

The sprockets 11 are fixed to shafts 10, which shafts are each concentrically mounted for rotation in the hollow shafts 12 by means of ball bearings 10'. At the end of each shaft 10, there is secured one of the shafts 9 in a position eccentric to shaft 10. When the shafts 10 are rotated, the shafts 9 describe circles, the centers of which are eccentric to the axes of the shafts 10, as do the advancement rolls 6. The diameters formed by the lugs 15' of the cog wheels are so much smaller than the diameters formed by the internal teeth 15 of the rolls 6, that the latter are capable of circling the lugs 15' in an eccentric manner caused by the eccentric mounting of the shafts 9.

As a particular advantage of the apparatus of the present invention, slippage between the advancement rolls and the casing can be substantially prevented by the improved adjustment of the reciprocating movement to the advance of the casing.

It will be obvious to those skilled in the art that many modifications may be made within the scope of the present invention without departing from the spirit thereof, and the invention includes all such modifications.

What is claimed is:

1. An apparatus for use in shirring sausage casings comprising a mandrel having a longitudinal axis and an abutment affixed thereto, a pair of opposed rolls mounted on opposite sides of the mandrel, means for rotating the rolls in opposite directions, and means for imparting reciprocating motion to the axes of said rolls in directions normal and parallel to the mandrel axis.

2. An apparatus according to claim 1 in which the mandrel has means for passing a fluid therethrough.

3. An apparatus according to claim 1 in which the rolls have grooves in the peripheries thereof.

4. An apparatus according to claim 1 in which the rolls are eccentrically and rotatably mounted on a frame.

5. An apparatus according to claim 1 in which a pair of nip rolls is mounted beyond the end of the mandrel.

References Cited by the Examiner

UNITED STATES PATENTS

| | | | |
|---|---|---|---|
| 2,583,654 | 1/1954 | Korsgaard | 17—42 |
| 2,722,715 | 11/1955 | Blizzard et al. | 17—45 |
| 2,983,949 | 5/1961 | Matecki | 17—42 |
| 3,022,929 | 2/1962 | Myers et al. | 226—186 X |
| 3,097,393 | 7/1963 | Matecki | 17—45 |
| 3,142,861 | 8/1964 | Riegler | 17—42 |

SAMUEL KOREN, *Primary Examiner.*

LUCIE H. LAUDENSLAGER, *Examiner.*